May 6, 1947.  M. J. MEEK  2,420,087
FISH LANDING NET
Filed Nov. 5, 1943
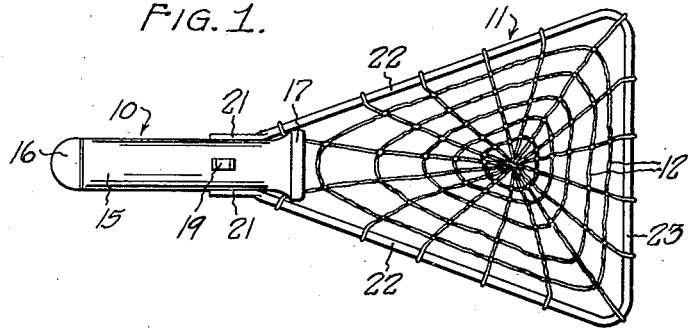
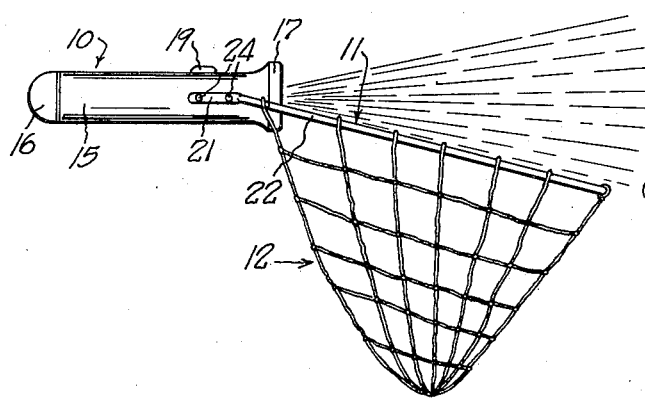
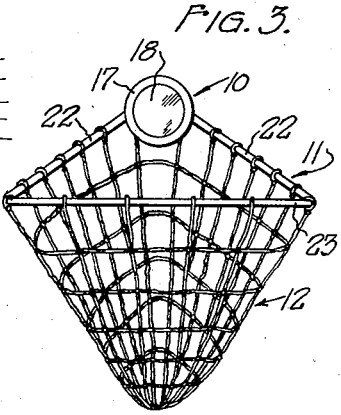
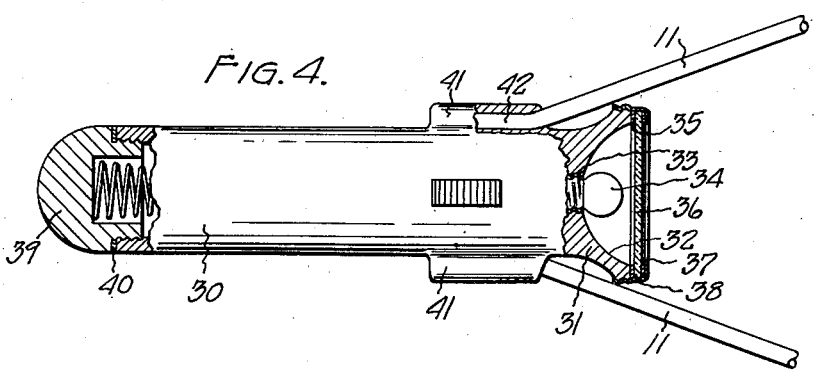
INVENTOR.
MELVIN J. MEEK.
BY
Oltsch & Knoblock
Attorneys.

Patented May 6, 1947

2,420,087

UNITED STATES PATENT OFFICE 2,420,087

FISH LANDING NET

Melvin J. Meek, South Bend, Ind., assignor of one-half to Bernard C. Hogquist, South Bend, Ind.

Application November 5, 1943, Serial No. 509,059

3 Claims. (Cl. 240—6.4)

This invention relates to improvements in fish landing nets.

The primary object of the invention is to provide a fish landing net with means carried by the handle thereof for directing a beam of light forwardly across the mouth of the net to enable the net to be used for night fishing by illuminating the space at and in front of the net.

A further object is to provide a fish landing net with a handle comprising a flashlight having an elongated tubular body to which a net frame is secured to extend in a plane angularly disposed relative to the axis of the body, whereby a beam of light from the end of the flashlight passes the mouth of the frame to illuminate objects adjacent the mouth of a fish net carried by the frame.

A further object is to provide a device of this character comprising a handle, a frame carried by and projecting longitudinally from said handle, and a net carried by said frame, wherein said handle comprises a flashlight having a watertight sealed housing and a lens at one end facing said frame.

Other objects will be apparent from the description, drawing and appended claims.

In the drawing:

Fig. 1 is a top plan view of the device.

Fig. 2 is a side view of the device.

Fig. 3 is an end view of the device.

Fig. 4 is a fragmentary enlarged view of a modified embodiment of the device, with parts broken away.

Referring to the drawing, which illustrates the preferred embodiment of the invention, the numeral 10 designates the handle of the device which mounts a frame 11 supporting a fish net 12.

The handle 10 may comprise a conventional flashlight having an elongated tubular body portion 15 having a removable closure 16 at one end to permit the removal and replacement of flashlight batteries (not shown) therein. At its opposite end, body portion 15 mounts a detachable retainer 17 for a lens 18 positioned transversely of the body portion. The flashlight is provided with a conventional switch member 19. The flashlight body is constructed of any suitable material, is suitably sealed to render the same watertight or waterproof, and may be of any shape, design and construction found suitable or desirable.

The frame 11 is preferably formed from rigid material, such as heavy wire, bent or formed to support net 12 and to be secured to handle 10. As illustrated in Figs. 1 to 3, frame 11 comprises flattened end portions 21 extending in parallel relation, diverging side portions 22 extending in a plane disposed at a slight angle to the plane of the end portions 21, and a front transversely extending portion 23. The end portions 21 are fixedly secured to the flashlight body 15 at the front end portion thereof, as by rivets or screws 24, and extend parallel to the axis of said body.

The net is used in the same manner as any conventonal fish landing net, that is, it is grasped at the handle 10 and the net and frame are moved through the water to trap therein and lift from the water a fish which has been hooked with the usual fishing tackle, such as rod, line and hook, and then drawn through the water to a position within reach of the angler. However, the device possesses the advantage that it can be used at night with equal facility. Thus, for use in darkness, the flashlight can be energized by manipulation of switch 19 which is so positioned that it can be operated by one finger of the hand which holds the net. The beam of light from the flashlight will be substantially coaxial therewith, as illustrated in Fig. 2, so that it passes alongside the frame at a slight angle thereto. Consequently, in night fishing, the light can be used to locate the fish, and in so doing the net is positioned automatically in convenient and proper position to permit quick and easy dipping thereof into the water to scoop up the fish. In this connection, it will be noted that the light beam is so directed that it illuminates the fish during the manipulation of the net to land the fish. Hence the angler is not required to grope about in the dark for the fish at any time during the use of the net, once the fish has been first sighted in the rays of the light beam; and all movements of the fish can be viewed and followed during the movements of the net preparatory to and during the final movement thereof by which the fish is scooped or netted and lifted from the water. It will be apparent that the watertight construction or sealing of the flashlight casing or body portion is important to render the flashlight operative during use in and adjacent the water.

The device is well adapted for construction of the flashlight casing from moldable or plastic material as illustrated in Fig. 4. The tubular body portion 30 may have an enlarged externally screw threaded forward end portion 31 provided with a transverse wall having an outer concave reflector surface 32. A configured or screw threaded metal sleeve 33 is imbedded in said wall to mount a flashlight bulb 34. A gasket ring 35 is positioned between the margin of end portion 31 and of lens 36, and another gasket ring 37 may be positioned between the lens and the lens retainer 38 which is screw threaded on end portion 31. The opposite end of the body portion 30 may have a screw threaded connection with a closure 39, and the joint therebetween may be sealed by a gasket ring 40. A pair of diametrically opposed longitudinal projections 41 may be formed integrally with body portion 30 adjacent the front thereof, and the end portions 42 of the net frame member 11 may be imbedded therein. This construction possesses the same advantages above mentioned, in addition to such advantages as simplicity and low cost resulting from the molded construction, as will be apparent.

I claim:

1. A fish landing net comprising a frame having converging end portions, a net carried by said frame, and a flashlight having a sealed casing secured to the end portions of said frame to form a projecting handle therefor, said flashlight having a lens and a light bulb at the inner end thereof for directing a beam of light centrally across said frame.

2. A fish landing net comprising a frame, a net carried by said frame, and a watertight flashlight having light projecting means at one end thereof, said frame having a pair of parallel outwardly projecting end portions extending at an angle to the plane of said frame, and means for securing said end portions to said flashlight parallel to the axis thereof with said frame projecting longitudinally and angularly from said light projecting end.

3. A fish landing net comprising a frame mounting a net, a water tight flashlight having a casing mounting light projecting means at one end, said casing being formed from molded material and having opposite longitudinal projections adjacent said light projecting means in which outwardly projecting parts of said frame are fixedly imbedded.

MELVIN J. MEEK.

REFERENCES CITED

The following references are of record in the file of this patent:

UNITED STATES PATENTS

| Number | Name | Date |
|---|---|---|
| 1,138,542 | Conekin | May 4, 1915 |
| 2,152,385 | Mayer et al. | Mar. 28, 1939 |
| 2,190,791 | Larson | Feb. 20, 1940 |
| 2,214,392 | Whipple | Sept. 10, 1940 |
| 1,253,769 | Anderson | Jan. 15, 1918 |
| 1,868,778 | Tomney | July 26, 1932 |
| 2,176,301 | Haas | Oct. 17, 1939 |
| 1,907,314 | Baer | May 2, 1933 |
| 2,314,521 | Schwartz | Mar. 23, 1943 |